Figure 1:
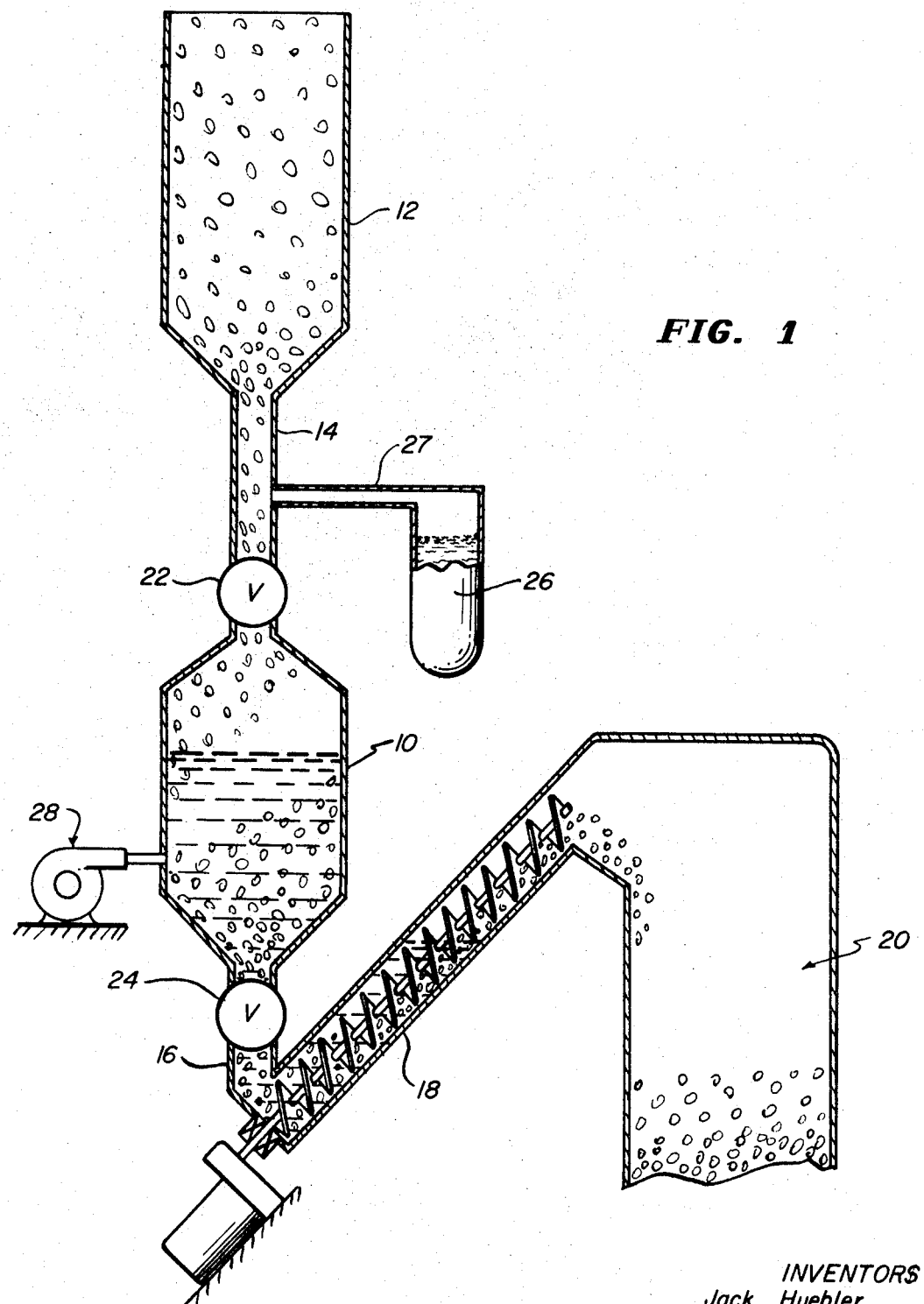

United States Patent
Huebler et al.

[11] 3,729,105
[45] Apr. 24, 1973

[54] LIQUID SEALED SOLIDS LOCK HOPPER

[75] Inventors: Jack Huebler, Deerfield; Sanford A. Weil, Chicago; Paul B. Tarman, Elmhurst, all of Ill.

[73] Assignee: The Institute of Gas Technology, Chicago, Ill.

[22] Filed: Sept. 27, 1971

[21] Appl. No.: 184,045

[52] U.S. Cl. ................................. 214/17 B, 214/152
[51] Int. Cl. ................................................. B65g 65/32
[58] Field of Search .............. 214/17 B, 17 A, 17 DA

[56] References Cited

UNITED STATES PATENTS

| | | | |
|---|---|---|---|
| 1,001,290 | 8/1911 | McKee | 214/17 B |
| 2,828,026 | 3/1958 | Strong | 214/17 B |

*Primary Examiner*—Gerald M. Forlenza
*Assistant Examiner*—George F. Abraham
*Attorney*—Dominik, Knechtel & Godula

[57] ABSTRACT

A method and apparatus for transferring solid materials between zones at substantially different pressures which includes, generally, an intermediate vessel or lock hopper which contains a liquid and can be filled with and emptied of solids, two valves, one at each end of the lock hopper, a solids feed device, and a pump to maintain liquid level in the system. In operation, the valve at the upper end of the lock hopper is opened while the valve at the lower end thereof is closed, thereby permitting solids to be transferred into the lock hopper which contains a liquid such as water. The solids displace some of the liquid, and the displaced liquid rises above the top valve and overflows into a collecting vessel. The top valve then is closed, and a pump adds or removes liquid until the pressure in the lock hopper is close to the reactor pressure. The lower or bottom valve is opened after the pressure differential is compensated for, allowing the solids to drop into a feeder which conveys the solids to the reactor. The liquid level in the feeder and the lock hopper is maintained by the pump to replace the volume of solids fed. This liquid level is maintained at a sufficient height to inhibit gas flow into the lock hopper, and is independent of operating pressures. After solids discharge, the bottom valve is closed and the top valve opened, and the cycle is repeated. For continuous solid feed, two or more valved lock lock hoppers can be used in tandem to feed solids to the feeder.

6 Claims, 1 Drawing Figure

INVENTORS
Jack Huebler
Sanford A. Weil
Paul B. Tarman

BY Dominik, Knechtel & Godula
ATTYS.

LIQUID SEALED SOLIDS LOCK HOPPER

This invention relates to a method and apparatus for transferring solid materials between zones at substantially different pressures.

There are many known processes wherein solids are transferred from a low pressure zone to a higher pressure zone. These processes may involve, for example, gas-solid heat exchange, gas adsorption, gasiform reactions in presence of catalysts, gas-solid reactions, solid regeneration or solid treatment and hydrocarbon conversion processes, to mention but a few of the many different processes in which such transfers are made.

The use of gas-fueled lock hoppers is a recognized method of transferring solids through a large pressure increase. Solids are added to the lock hopper at low pressure and then an appropriate gas is pumped into the hopper, pressurizing the hopper chamber to a high pressure. Thereupon, the hopper is opened to the reactor to deliver the solids. The hopper-reactor valve is closed and the hopper is bled down to the low pressure to restart the cycle. This procedure requires recompression or loss of reactor gases. Furthermore, the gas pressure increase in the hopper is a major portion of the cycle time. This has economic penalties since the hopper size to do a given job increases with the cycle time.

In most cases, the solids are transferred through a hopper into a reactor operating at a higher pressure than the zone from which the solids are supplied. It has been a generally standard practice to construct the hopper in the form of an elongated gravity feed leg above the reactor, and the solids are gravitated continuously through this leg to gradually build up the pressure to reactor pressure. The solids feed smoothly and continuously into the reactor as long as the leg has sufficient length to overcome the pressure differential.

Such systems are acceptable in those processes wherein only modest pressure differentials in the order of 10 p.s.i. are encountered, since about 4 to 5 feet of leg for each pound of pressure differential are required. Accordingly, if a pressure differential of only 50 p.s.i. is encountered, the leg would have to be 250 feet tall. A leg this tall is impractical. Therefore, in many present processes wherein pressure differentials in the order of 100 to 300 p.s.i are common, the use of a gravity feed leg to feed the solids to the reactor are out of the question.

Considerable work has been done over recent years to improve the operation of these systems employing gravity feed legs. Additional work has been directed to providing improved ways of introducing the solids into a reactor at elevated pressures which would not require the tall structures required by the gravity feed leg.

For example, U.S. Pat. No. 2,626,235 discloses a system employing a gravity feed leg. An inert seal vapor, such as steam, is introduced into the lower section of the feed leg, to prevent the gasiform material in the reaction zone from escaping upwardly through the solid feed leg. In such a system, if the solid feed particles are at a relatively low temperature, the steam will be condensed on the solid particles. This may eventually cause clogging or bridging of the solid flow in the feed leg resulting in partial or complete stoppage of solid flow to the reaction zone. The invention is concerned with eliminating the possibility of such stoppages, and does not disclose or suggest any improved way of introducing the solids into a reactor, other than by a gravity feed leg. Accordingly, while the invention may provide improvements for systems employing gravity feed legs, it provides no solution to eliminating the tall structure which would be required in a system where high reactor pressure differentials are encountered.

U.S. Pat. No. 2,704,704 relates to a method of gasifying carbonaceous solids, and discloses a method and apparatus to transfer solids to a high pressure reactor, or zone, operating at a pressure of 400 pounds per square inch. In this case, it is proposed to use a vertical column of a high density liquid of sufficient length to develop a desired pressure differential between the low and high pressure zones. The solid material is transferred through this column of liquid. It is suggested that a satisfactory heavy liquid medium for providing a tight gas seal and a high pressure differential is mercury.

Accordingly, in this system, the gravity feed leg is replaced by a column of high density liquid. The height of the column is thereby substantially reduced; however, since the solids generally float on the high density liquid, the solids must be conveyed by some means through the column of liquid. Furthermore, high density liquids such as mercury are exceedingly expensive for use in such applications. Therefore, while this patent does teach a method of reducing the height of the column through which the solids are transferred, it is far from an economically feasible solution because of the costs of the high density liquid required.

A system for supplying solid feed material to a retort operating under superatmospheric pressure also is disclosed in U.S. Pat. No. 2,828,026. In this system, a feeding and metering mechanism in the form of a drum having rotating feeder buckets therein is employed. In order to maintain a seal against the escape of pressure through the mechanism, a suitable sealing liquid such as water, aqueous salt solutions, diphenyl and the like is admitted to the drum, preferably to a level slightly above the axis of the drum. A standpipe extends from the lower portion of the feeder, and the sealing liquid in the feeder may rise in this pipe to whatever level may be necessary to counterbalance the operating pressure of the retort. It is apparent that this system can only be used in those cases where small pressure differentials are encountered, otherwise, as in the case of a gravity feed leg, the standpipe would have to be of an extremely long length.

Another system employing a gravity feed leg is disclosed in U.S. Pat. No. 2,885,099. The system, or the feed leg, is designed for operation with a reactor operating at a pressure of about 10 pounds per square inch.

In U.S. Pat. No. 2,925,928, a column of finely divided fluidized solids in a standpipe is used to balance the difference in pressure between the atmosphere and the treating zone of relatively high pressure. In the case where it is desired to feed coarse solids to a treating zone of higher pressure through the standpipe, the density of the mass of fluidized solids in the standpipe is selected to be less than the apparent density of the course solids which are to be fed to the treating zone. In this situation, then, if the coarse solids are introduced into the top of the standpipe containing the fluidized bed of finely divided solids, the coarse solids will fall due to the force of gravity through the fluidized bed in the standpipe and pass to the treating zone of relatively high pressure. The coarse solids in passing from the standpipe to the treating zone are separated from the bed of finely divided fluidized solids constantly maintained in the standpipe by action of the fluidizing gas.

The described system is particularly applicable to introduce relatively coarse as opposed to fine solids into a reactor. Again, however, the system is limited to use where pressure differentials of about 10 to 20 p.s.i. are encountered.

U.S. Pat. No. 2,985,324 discloses a special double lock hopper arrangement for discharging particles entrained in a fluid from a high pressure zone to a low pressure zone. Valves are provided between the double lock hoppers, and the operation of the valves is such as to prevent the particles transferred from being crushed or sheared.

U.S. Pat. No. 3,009,588 discloses a system which operates on generally the same principle as that set forth in U.S. Pat. No. 2,704,704. In this case also, a liquid having a density substantially greater than the solids transferred is used to provide a liquid seal. Liquids such as molten lead, mercury, tin, and molten alloys are suggested as satisfactory. This method, therefore, suffers the same disadvantages associated with other methods using heavy density liquids.

From the above brief description of various different approaches for transferring solids from a zone of low pressure to a high pressure, most are directed to merely improving the operation of gravity feed legs used in such systems, or to improving fluidized bed type systems. Even where such improvements are made, the systems are applicable in those cases where only relatively small pressure differentials in the order of 10 to 20 p.s.i are encountered. In any system where a high pressure differential is found, the usual method of preventing the escape of any gas from the high pressure zone uses a heavy density liquid to form a gas seal.

The disadvantages of these prior systems, particularly of those used in high pressure differential applications, are overcome with the method and apparatus of the present invention which includes, generally, an intermediate vessel or lock hopper which contains a liquid and can be filled with and emptied of solids, two valves, one at each end of the lock hopper, a solids feed device, and a pump to maintain liquid level in the system. In operation, the valve at the upper end of the lock hopper is opened while the valve at the lower end thereof is closed, thereby permitting solids to be transferred into the lock hopper which contains a liquid such as water. The solids displace some of the liquid, and the displaced liquid rises above the top valve and overflows into a collecting vessel. The top valve then is closed, and a pump adds or removes liquid until the pressure in the lock hopper is close to the reactor pressure. If the reactor pressure is above that of the lock hopper, very little added liquid is necessary to equalize the pressures of the reactor and the lock hopper. If the reactor pressure is below that of the lock hopper, the amount of liquid removed will be dependent on the gas trapped in the pores of the solids. The lower or bottom valve is opened after the pressure differential is compensated for, allowing the solids to drop into a feeder which conveys the solids to the reactor. The liquid level in the feeder and the lock hopper is maintained by the pump to replace the volume of solids fed. This liquid level is maintained at a sufficient height to inhibit gas flow into the lock hopper, and is independent of operating pressures. After solids discharge, the bottom valve is closed and the top valve opened, and the cycle is repeated. For continuous solid feed, two or more valved lock hoppers can be used in tandem to feed solids to the feeder.

It is understood that the mechanism that feeds a lower pressure reactor is identical to that which removes solids from a high pressure reactor. A similar comparison exists between feeding high pressure reactors and emptying low pressure reactors.

A system of this type provides numerous advantages over systems of the type previously described. In particular, the solids are transferred through a liquid phase rather than a gaseous phase, thus eliminating gas interchange between different pressure zones, as well as the need to cyclically pressurize or depressurize an intermediate lock hopper with gas, as for example, in U.S. Pat. No. 2,985,324 described above. Furthermore, the valves can be of a much simpler design, since they hold only water pressure and not gas pressure. Shorter cycle times, and hence smaller lock hoppers, can be used since only a very short time is required to pressurize the lock hopper using a liquid as opposed to a gas. In this respect, the liquid seal height also is independent of operating pressure so that high gravity feed legs are eliminated. Furthermore, if the apparatus is used to transfer solids between two systems, no gas loss from either system is encountered, nor is there any mixing of the gases of either system. Still another advantage is the fact that no compressors are required to recover or recycle gases lost from the system. In addition to the above enumerated advantages, others will be apparent from the description below.

Accordingly, it is an object of the present invention to provide an improved method and apparatus for transferring solid materials between zones at substantially different pressures.

Another object is to provide an improved method and apparatus of the above type using a liquid seal to restrict gas flow between these zones, or between different gaseous systems, wherein the height of the liquid seal is independent of operating pressures.

Other objects of the invention will in part be obvious and will in part appear hereinafter.

The invention accordingly comprises the several steps and the relation of one or more of such steps with respect to each of the others and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings in which:

FIG. 1 is a schematic elevation view, in section, of the apparatus exemplary of the invention.

In referring to this FIGURE, it can be seen that the solids transfer system includes a vessel or lock hopper 10 which is coupled to a storage bin 12 at its upper end, by means of a column 14. The lower end of the lock hopper 10 discharges through a lower column 16, into the lower end of a feeder 18 adapted to convey solids deposited therein, into the upper end of a vessel or reactor 20. The columns 14 and 16 contain valves 22 and 24, respectively, and a liquid collecting vessel 26 is coupled by a conduit 27 to the column 14 a spaced distance above the valve 22. A pump 28 is coupled to and adapted to add or remove liquid from the lock hopper 10.

The process in which the apparatus is used may involve gas-solid heat exchange, gas adsorption, gasiform reactions in presence of catalysts, gas-solid reactions, solid regeneration or solid treatment or hydrocarbon conversion processes, and the solids to be transferred may be any type solids used in these processes. As briefly explained above, and as will be more apparent from the description below, the pressure differentials between the vessel or reactor 20 and the storage bin 12, or another system, can be substantial, on the order of 300 to 1000 p.s.i. or greater, and the arrangement is such as to prevent any gas transfer between the different zones or systems. Furthermore, the height of the liquid seal is independent of the operating pressure. It depends only on the precision with which the pump can match the pressures of hopper 10 and reactor 20.

The solids can be fed into the storage bin 12 in any suitable fashion, and this storage bin can be maintained filled, if desired. Alternatively, a predetermined measured quantity of solids can be fed into the storage bin. The latter operation may be desirable in those cases where crushing or shearing of the solids produces an undesirable result, as for example, when a contact material of the type used in the TCC process for cracking hydrocarbons is being transferred.

In operation, the valve 22 is opened to permit the solids in the storage bin 12 to drop by gravity into the lock hopper 10 which contains a liquid. The valve 24, at this time, is closed. The liquid within the lock hopper 10 may be any suitable liquid, such as water, having a lower density than the solids being transferred. As the solids drop into the lock hopper 10, the liquid therein is displaced and the overflow, if any, flows through the column 14 and the conduit 27 into the collecting vessel 26. This liquid can be recycled, if desired, or simply discharged from the system by suitable means.

Valve 22 then is closed. If the pressure within the lock hopper 10 is below that of the vessel or reactor 20, the pump 28 is operated to add liquid to the lock hopper 10, until its pressure is close to or the same as that of the reactor 20. It may be noted that very little liquid normally is required to increase the pressure within the lock hopper 10 since it is essentially full of solids and liquid which are incompressible and only sufficient liquid need be added to build up the pressure. The cycle time of the lock hopper 10 therefore is very short. This latter factor also permits much smaller lock hoppers to be used, than normally required in gas systems, since the required size of the lock hopper varies directly as the cycle time.

If the reactor pressure is below that of the lock hopper 10, the pump 28 is operated to remove liquid. The amount of liquid removed is dependent upon the gas trapped in the pores of the solids in the lock hopper.

When the pressure differential has been equalized, the valve 24 is opened, allowing the solids in the lock hopper 10 to drop into the feeder 18. The latter may be a screw-type conveyor, as illustrated, or any other suitable conveyor which is capable of transporting the solids to the top of the reactor 20.

The liquid level in the feeder 18 and in the lock hopper 10 is maintained by the pump 28, to replace the volume of solids fed into the reactor. This liquid level is maintained at sufficient height to inhibit gas flow into the lock hopper 10, however, this height is independent of the operating pressure of the reactor 10. This results from the fact that the pump 28 adds or removes liquid to minimize any pressure differential. If a pressure differential is built up in the lock hopper 10, as the solids are discharged and fed into the reactor 20, the pump 28 is operated to counteract this pressure.

After the solids have been discharged from the lock hopper 10, the valve 24 is closed and the cycle is repeated.

The valves 22 and 24 are preferably motor operated valves and, in a preferred embodiment, the valves 22 and 24 as well as the pump 28 all are operated from a programmer which coordinates their operation. For example, the programmer first operates to open and close the valve 22 to feed solids into the lock hopper. Thereafter, when pressure sensing means associated with the lock hopper 10 provides signals to the programmer, the latter, in turn, controls the operation of the pump 28 to equalize the pressure differential between the reactor 20 and the lock hopper 10. When an established pressure is reached, the programmer operates the valve 24 to permit the solids to drop into the feeder 18, and further, continues to operate the pump 28 to maintain the established pressure or liquid height as the solids are fed into the reactor. It can be seen that such a system is completely automatic in operation, and can be used to provide a continuous supply of solids to the reactor 20.

It will thus be seen that the objects set forth above, among those made apparent from the preceding description, are efficiently attained and certain changes may be made in carrying out the above method and in the construction set forth. Accordingly, it is intended that all matter contained in the above description or shown in the accompanying drawings shall be interpreted as illustrative and not in a limiting sense.

Now that the invention has been described, what is claimed as new and desired to be secured by Letters Patent is:

1. Apparatus for transferring solid materials between zones at substantially different pressures comprising storage means for retaining a supply of solid material; a lock hopper coupled to and storage means for receiving the solid material, said lock hopper containing a liquid having a density less than said solid material; a first valve included in the coupling between said storage means and said lock hopper; a vessel to receive said solid material; a feeder for feeding said solid material to said vessel coupled to the lower end of said lock hopper and receiving solid materials discharged from said lock hopper; a second valve included in the coupling between said lock hopper and said feeder; and a pump coupled to said lock hopper operable to add to or remove liquid from said lock hopper to increase and decrease the pressure within said lock hopper, said first valve being operated to permit solid material to be discharged from said storage means into said lock hopper and said second valve being operated to discharge said solid material from said lock hopper into said feeder.

2. The apparatus of claim 1, wherein said liquid comprises water.

3. The apparatus of claim 1, wherein said pump is operated to maintain the liquid level in said lock hopper and said feeder at a height to maintain a pressure within said lock hopper to inhibit gas flow into said lock hopper.

4. The apparatus of claim 1, further including a liquid collecting vessel affixed to the coupling between said storage means and said lock hopper for collecting liquid displaced from said lock hopper by the solid material supplied thereto.

5. A method for transferring solid materials between zones at substantially different pressures comprising the steps of supplying solid materials from a storage means to a lock hopper containing a liquid having a density lighter than said solid material; sealing said lock hopper; adding to or removing liquid from said lock hopper to increase and decrease the pressure within said lock hopper to substantially equalize the pressure differential between said lock hopper and a pressure zone to which said solid material is to be transferred, opening said lock hopper to allow said liquid to form a seal and then discharging said solid material from said lock hopper thru said liquid for transfer to said other pressure zone.

6. The method of claim 5, further including the step of maintaining the liquid level in said lock hopper at a sufficient height to maintain a pressure within said lock hopper to inhibit gas flow into said lock hopper.

* * * * *